(12) United States Patent
Noh et al.

(10) Patent No.: US 12,185,427 B2
(45) Date of Patent: *Dec. 31, 2024

(54) DETERMINING THE NUMBER OF SYMBOLS IN A DATA FIELD OF A FRAME BASED ON AGGREGATION

(71) Applicant: NEWRACOM, Inc., Irvine, CA (US)

(72) Inventors: Yujin Noh, Irvine, CA (US); Yongsuk Hwang, Irvine, CA (US); Hyungu Park, Irvine, CA (US)

(73) Assignee: NEWRACOM, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,274

(22) Filed: Oct. 11, 2023

(65) Prior Publication Data

US 2024/0049356 A1 Feb. 8, 2024

Related U.S. Application Data

(63) Continuation of application No. 17/451,313, filed on Oct. 18, 2021, now Pat. No. 11,844,148, which is a
(Continued)

(51) Int. Cl.
*H04L 1/00* (2006.01)
*H04L 1/06* (2006.01)
(Continued)

(52) U.S. Cl.
CPC ........... *H04W 80/08* (2013.01); *H04L 1/0003* (2013.01); *H04L 1/0008* (2013.01);
(Continued)

(58) Field of Classification Search
None
See application file for complete search history.

(56) References Cited

U.S. PATENT DOCUMENTS

| | | | |
|---|---|---|---|
| 11,184,948 B2* | 11/2021 | Noh | H04W 80/08 |
| 2013/0279379 A1* | 10/2013 | Yang | H04L 27/2602 370/310 |
| 2016/0119002 A1* | 4/2016 | Yang | H04L 1/0015 714/776 |

OTHER PUBLICATIONS

IEEE Standards association, Part 11: Wireless LAN Medium Access Control (MAC) and Physical Layer (PHY) Specifications, 2016, IEEE, p. 397-510 (Year: 2016).*

(Continued)

*Primary Examiner* — Kouroush Mohebbi
(74) *Attorney, Agent, or Firm* — Nicholson, De Vos, Webster & Elliott, LLP

(57) ABSTRACT

A method for determining a number of symbols in a data field of a physical layer (PHY) protocol data unit (PPDU) is described. The method includes determining, by a wireless transmitting device, whether an aggregation subfield of a signal field of the PPDU is to be set to 1 and responsive to determining that the aggregation subfield of the signal field of the PPDU is not to be set to 1, calculating, by the wireless transmitting device, the number of symbols in the data field of the PPDU based on a PHY service data unit (PSDU) length value, wherein the PSDU length value is provided in a transmission vector (TXVECTOR) and the TXVECTOR also includes an aggregated media access control (MAC) protocol data unit pre-end-of-frame padding (APEP) length value of the PPDU.

20 Claims, 22 Drawing Sheets

Related U.S. Application Data continuation of application No. 16/457,208, filed on Jun. 28, 2019, now Pat. No. 11,184,948.

(60) Provisional application No. 62/691,494, filed on Jun. 28, 2018.

(51) Int. Cl.
  *H04W 80/02* (2009.01)
  *H04W 80/08* (2009.01)
  *H04L 5/00* (2006.01)

(52) U.S. Cl.
  CPC .......... *H04L 1/0061* (2013.01); *H04L 1/0643* (2013.01); *H04W 80/02* (2013.01); *H04L 5/0007* (2013.01)

(56) References Cited

OTHER PUBLICATIONS

Final Office Action, U.S. Appl. No. 16/457,208, Jan. 8, 2021, 26 pages.
Final Office Action, U.S. Appl. No. 17/451,313, Apr. 21, 2023, 29 pages.
IEEE Std 802.Nov. 2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.
IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.
Non-Final Office Action, U.S. Appl. No. 16/457,208, Jul. 10, 2020, 20 pages.
Non-Final Office Action, U.S. Appl. No. 17/451,313, Oct. 25, 2022, 25 pages.
Notice of Allowance, U.S. Appl. No. 16/457,208, Jul. 19, 2021, 8 pages.
Notice of Allowance, U.S. Appl. No. 17/451,313, Jul. 17, 2023, 8 pages.

* cited by examiner

| | |
|---|---|
| FREQUENCY BAND | LICENSE-EXEMPT BANDS BELOW 1 GHZ, EXCLUDING THE TV WHITE SPACES |
| CHANNEL WIDTH | 1/2/4/8/16 MHZ |
| MODULATION SCHEMES | BPSK, QPSK, 16-QAM, 64-QAM, 256-QAM |
| MAXIMUM NUMBER OF SPATIAL STREAMS | FOUR SPATIAL STREAMS |
| RANGE | UP TO 1KM (OUTDOOR) |
| END NODE TRANSMIT POWER | DEPENDENT ON REGIONAL REGULATIONS (FROM 1 MW TO 1 W) |
| PACKET SIZE | UP TO 7,991 BYTES (WITHOUT AGGREGATION) UP TO 65,535 BYTES (WITH AGGREGATION) |
| DATA RATE | 150 KB/S (1 MHZ CHANNEL BANDWIDTH, 1 SPATIAL STREAM, BPSK, 1/2 CODING RATE, REPETITION CODING) TO 347 MB/S (16 MHZ CHANNEL BANDWIDTH, 4 SPATIAL STREAMS, 256 QAM, 5/6 CODING RATE) |
| NUMBER OF STATIONS | UP TO 6000 |
| LOCATION | INDOOR AND OUTDOOR |
| TRAFFIC TYPE | PERIODIC PACKET TRANSMISSION EVERY FEW TO TENS MINUTES |

FIG. 6

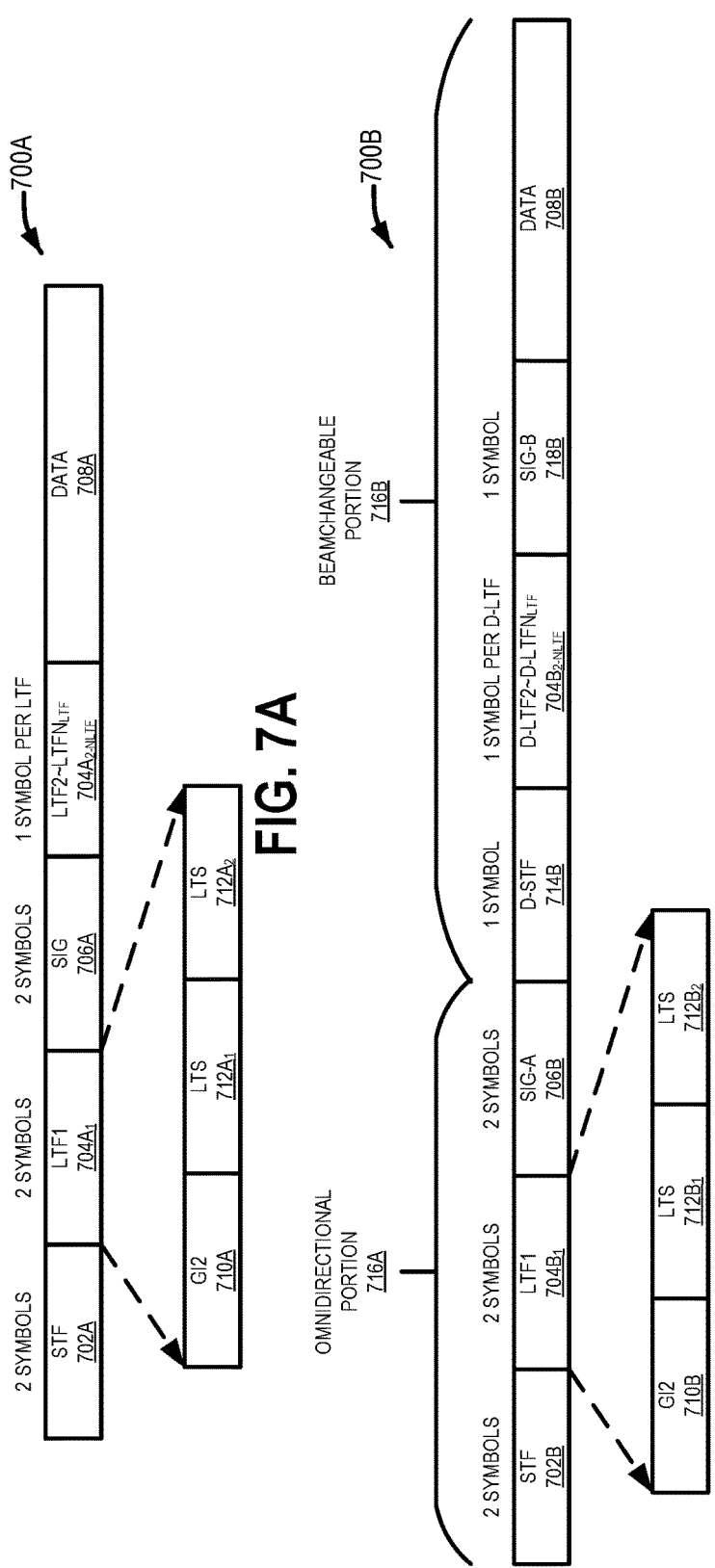
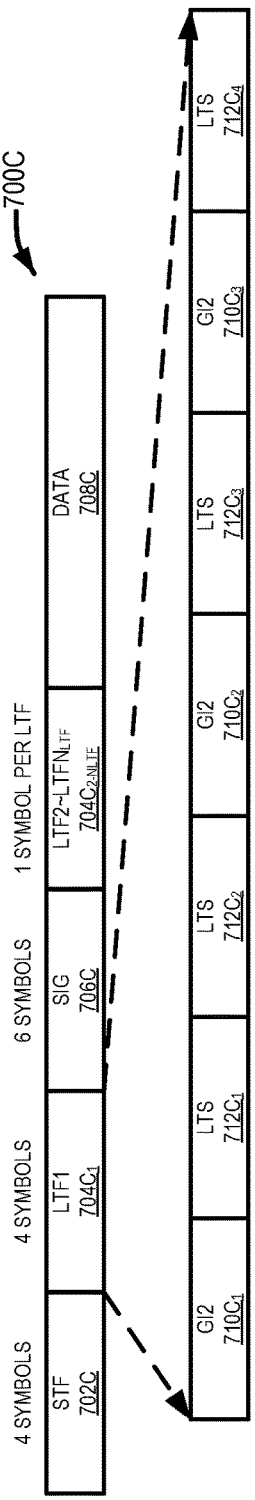
FIG. 7A
FIG. 7B
FIG. 7C

| FIELD | DESCRIPTION |
|---|---|
| STF | SHORT TRAINING FIELD |
| LTF | LONG TRAINING FIELD |
| SIG | SIGNAL FIELD |
| SIG-A | SIGNAL A FIELD |
| D-DTF | SHORT TRAINING FIELD FOR THE BEAM CHANGEABLE PORTION |
| D-LTF | LONG TRAINING FIELD FOR THE BEAM CHANGEABLE PORTION |
| SIG-B | SIGNAL B FIELD |
| DATA | THE DATA FIELD CARRIES THE PSDU(S) |
| GI | GUARD INTERVAL |
| GI2 | DOUBLE GUARD INTERVAL |
| LTS | LONG TRAINING SYMBOL |

FIG. 8

| Symbol | Bit | Field | Description |
|---|---|---|---|
| SIG-1 | B0 | Reserved 902 | Reserved. Set to 1. |
| | B1 | STBC 904 | Set to 1 if all spatial streams have space-time block coding and set to 0 if no spatial stream has space-time block coding. |
| | B2 | Uplink Indication 906 | Set to the value of the TXVECTOR parameter UPLINK_INDICATION. |
| | B3-B4 | BW 908 | If FORMAT is SIG in TXVECTOR, set to<br>0 when CH_BANDWIDTH is CBW2<br>1 when CH_BANDWIDTH is CBW4<br>2 when CH_BANDWIDTH is CBW8<br>3 when CH_BANDWIDTH is CBW16<br><br>If FORMAT is SIG_DUP_2M in TXVECTOR, set to 0. |
| | B5-B6 | Nsts 910 | Set to 0 for 1 space-time stream<br>Set to 1 for 2 space-time streams<br>Set to 2 for 3 space-time streams<br>Set to 3 for 4 space-time streams |
| | B7-B15 | ID 912 | If Uplink Indication field is not present or set to 1, set to the value of the TXVECTOR parameter PARTIAL_AID. PARTIAL_AID provides an abbreviated indication of the intended recipient(s) of the PSDU (see 10.21). If the Uplink Indication field is set to 0, B7-B9 are set to the value of the TXVECTOR parameter COLOR and B10-B15 are set to the value of the TXVECTOR parameter PARTIAL_AID. |
| | B16 | Short GI 914 | Set to 0 if short guard interval is not used in the Data field.<br>Set to 1 if short guard interval is used in the Data field. |
| | B17 | Coding 916 | Set to 0 for BCC and 1 for LDPC. |
| | B18 | LDPC Extra 918 | If Coding field is 1, set to 1 if the LDPC PPDU encoding process (of an SU PPDU), results in an extra OFDM symbol (or symbols) as described in 21.3.10.5.4 (LDPC coding), otherwise set to 0.<br><br>If Coding field is 0, this field is set to 1. |
| | B19-B22 | MCS 920 | MCS Index |
| | B23 | Smoothing 922 | A value of 1 indicates that channel smoothing is recommended.<br>A value of 0 indicates that channel smoothing is not recommended. |

FIG. 10A

| Symbol | Bit | Field | Description |
|---|---|---|---|
| SIG-2 | B0 | Aggregation 924 | Set to 1 when aggregation is ON (as indicated by AGGREGATION parameter of TXVECTOR), and 0 otherwise.<br>NOTE – SIG PPDUs are transmitted with aggregation ON when PSDU to be carried is greater than 511 octets, as defined in 10.12.5. |
| | B1-B9 | Length 926 | When the Aggregation bit is equal to 0, set to the value of the PSDU-LENGTH parameter in TXVECTOR.<br>When the Aggregation bit is equal to 1, set to N_sym, given in 23.4.3 (TXTIME and PSDU_LENGTH calculation). |
| | B10-B11 | Response Indication 928 | Set to the value obtained from the TXVECTOR parameter RESPONSE_INDICATION. The Response Indication field indicates the presence and type of frame that is expected to follow SIFS after the current frame transmission (see 10.3.2.5). |
| | B12 | Traveling Pilots 930 | Set to 1 to indicate traveling pilots usage in packet. Otherwise, 0 to indicate regular pilot tone locations. |
| | B13 | NDP Indication 932 | Used to indicate that frame is a Control NDP frame. If set to 1, then the SIG field format is shown in Figure 23-21 (SIG field format for ≥ 2 MHz NDP CMAC frame(11ah)) (in 23.3.11) and the SIG field contents follow the description in 9.9 (NDP CMAC frames(11ah)). |
| | B14-B17 | CRC 934 | CRC calculated as in 23.3.8.2.1.5 (CRC calculation for SIG SIG-A fields). |
| | B18-B23 | Tail 936 | Used to terminate the trellis of the convolutional decoder.<br>Set to 0. |

FIG. 10B

| Symbol | Bit | Field | Description |
|---|---|---|---|
| SIG-A1 | B0 | MU/SU 1102 | Set to 0 for SU PPDUs. |
| | B1 | STBC 1104 | Set to 1 if all spatial streams have space-time block coding and set to 0 if no spatial stream has space-time block coding. |
| | B2 | Uplink Indication 1106 | Set to the value of the TXVECTOR parameter UPLINK_INDICATION. |
| | B3-B4 | BW 1108 | Set to 0 for 2 MHz, 1 for 4 MHz, 2 for 8 MHz, 3 for 16 MHz. |
| | B5-B6 | Nsts 1110 | Set to 0 for 1 space-time stream<br>Set to 1 for 2 space-time streams<br>Set to 2 for 3 space-time streams<br>Set to 3 for 4 space-time streams |
| | B7-B15 | ID 1112 | If Uplink Indication field is not present or set to 1, set to the value of the TXVECTOR parameter PARTIAL_AID. PARTIAL_AID provides an abbreviated indication of the intended recipient(s) of the PSDU (see 10.21). If the Uplink Indication field is set to 0, B7-B9 are set to the value of the TXVECTOR parameter COLOR and B10-B15 are set to the value of the TXVECTOR parameter PARTIAL_AID. |
| | B16 | Short GI 1114 | Set to 0 if short guard interval is not used in the Data field.<br>Set to 1 if short guard interval is used in the Data field. |
| | B17 | Coding 1116 | Set to 0 for BCC and 1 for LDPC. |
| | B18 | LDPC Extra 1118 | If Coding field is 1, set to 1 if the LDPC PPDU encoding process (of an SU PPDU) results in an extra OFDM symbol (or symbols) as described in 21.3.10.5.4 (LDPC coding), otherwise set to 0.<br><br>If Coding field is 0, this field is set to 1. |
| | B19-B22 | MCS 1120 | MCS Index |
| | B23 | Beam Change/ Smoothing Indication 1122 | If Nsts subfield indicates 1 space-time stream, this field is a Beam Change Indication field:<br>- A value of 1 indicates that the Q matrix is changed from the omnidirectional portion to the beam changeable portion of the preamble, in at least one of the nonzero subcarriers of the omnidirectional portion.<br>- A value of 0 indicates that the Q matrix is unchanged in all the nonzero subcarriers of the omnidirectional portion.<br><br>If Nsts subfield indicates more than 1 space-time stream, this field is a Smoothing Indication field:<br>- A value of 1 indicates that channel smoothing is recommended.<br>- A value of 0 indicates that that channel smoothing is not recommended.<br><br>See NOTE 1.<br>See NOTE 2. |

FIG. 12A

| Symbol | Bit | Field | Description |
|---|---|---|---|
| SIG-A2 | B0 | Aggregation 1124 | Set to 1 when aggregation is ON (as indicated by AGGREGATION parameter of TXVECTOR), and 0 otherwise.<br>NOTE – SIG PPDUs are transmitted with aggregation ON when PSDU to be carried is greater than 511 octets, as defined in 10.12.5. |
| | B1-B9 | Length 1126 | When the Aggregation bit is equal to 0, set to the value of the PSDU-LENGTH parameter in TXVECTOR. When the Aggregation bit is equal to 1, set to N_sym, given in 23.4.3 (TXTIME and PSDU_LENGTH calculation). |
| | B10-B11 | Response Indication 1128 | Set to the value obtained from the TXVECTOR parameter RESPONSE_INDICATION. The Response Indication field indicates the presence and type of frame that is expected to follow SIFS after the current frame transmission (see 10.3.2.5). |
| | B12 | Reserved 1130 | Reserved. Bit set to 1. |
| | B13 | Traveling Pilots 1132 | Set to 1 to indicate traveling pilots usage in packet. Otherwise, 0 to indicate regular pilot tone locations. |
| | B14-B17 | CRC 1134 | CRC calculated as in 23.3.8.2.1.5 (CRC calculation for SIG SIG-A fields). |
| | B18-B23 | Tail 1136 | Used to terminate the trellis of the convolutional decoder. Set to 0. |
| NOTE 1 – When the Nsts subfield indicates 1 space-time stream, if Beam Change/Smoothing Indication field is set to 0, the receiver may do channel smoothing. Otherwise, smoothing is not recommended. | | | |
| NOTE 2 – The Q matrix for omnidirectional portion is $Q_k^{(omni)}$ as defined in 23.2.7 (Mathematical description of signals). | | | |

FIG. 12B

| Symbol | Bit | Field | Description |
|---|---|---|---|
| SIG-A1 | B0 | MU/SU 1302 | Set to 1 for MU PPDUs. |
| | B1 | STBC 1304 | Set to 0 in MU PPDUs. |
| | B2 | Reserved 1306 | Reserved. Set to 1. |
| | B3-B10 | NSTS 1308 | NSTS is divided into 4 user positions of 2 bits each, denoted by 4 subfields MU[0] Nsts ...MU[3] Nsts. User position $p$, where $0 \leq p \leq 3$, uses bits $B(3 + 2p) - B(4 + 2p)$. The space-time streams of user u are indicated at user position $p$ = USER_POSITION[$u$] where $u$ = 0, 1, ...NUM_USERS − 1 and the notation A[$b$] denotes the value of array A at index $b$. Zero space-time streams are indicated at positions not listed in the USER_POSITION array.<br>Set to 0 for 1 space-time stream<br>Set to 1 for 2 space-time streams<br>Set to 2 for 3 space-time streams<br>Set to 3 for 4 space-time streams |
| | B11-B12 | BW 1310 | Set to 0 for 2 MHz, 1 for 4 MHz, 2 for 8 MHz, 3 for 16 MHz. |
| | B13-B8 | GID 1312 | In an MU PPDU, the Group ID is set as defined in 23.3.10.4 (Group ID) |
| | B19 | Short GI 1314 | Set to 0 if short guard interval is not used in the Data field.<br>Set to 1 if short guard interval is used in the Data field. |
| | B20-B23 | Coding-I 1316 | If the MU[0] NSTS field is nonzero, then B20 indicates coding for user 0: set to 0 for BCC, 1 for LDPC.<br>If the MU[0] NSTS field is 0, then B20 is reserved and set to 1.<br>If the MU[1] NSTS field is nonzero, then B21 indicates coding for user 1: set to 0 for BCC, 1 for LDPC.<br>If the MU[1] NSTS field is 0, then B21 is reserved and set to 1.<br>If the MU[2] NSTS field is nonzero, then B22 indicates coding for user 2: set to 0 for BCC, 1 for LDPC.<br>If the MU[2] NSTS field is 0, then B22 is reserved and set to 1.<br>If the MU[3] NSTS field is nonzero, then B23 indicates coding for user 3: set to 0 for BCC, 1 for LDPC.<br>If the MU[3] NSTS field is 0, then B23 is reserved and set to 1. |

FIG. 14A

| Symbol | Bit | Field | Description |
|---|---|---|---|
| SIG-A2 | B0 | Coding-II 1318 | Set to 1 if at least one LDPC user's PPDU encoding process results in an extra OFDM symbol (or symbols) as described in 21.3.10.5.4 (LDPC coding) and 21.3.10.5.5. (Encoding process for VHT MU PPDUs). Set to 0 otherwise. |
| | B1 | Reserved 1320 | Reserved. Set to 1. |
| | B2-B10 | Length 1322 | Set to the $N_{sym}$, given in 23.4.3 (TXTIME and PSDU_LENGTH calculation).<br><br>NOTE – A-MPDU is always used for MU PPDUs. |
| | B11-B12 | Response Indication 1324 | Set to the value obtained from the TXVECTOR parameter RESPONSE_INDICATION. The Response Indication field indicates the presence and type of frame that is expected to follow SIFS after the current frame transmission (see 10.3.2.5). |
| | B13 | Traveling Pilots 1326 | Set to 1 to indicate traveling pilots usage in packet. Otherwise, 0 to indicate regular pilot tone locations. |
| | B14-B17 | CRC 1328 | CRC calculated as in 23.3.8.2.1.5 (CRC calculation for SIG SIG-A fields). |
| | B18-B23 | Tail 1330 | Used to terminate the trellis of the convolutional decoder. Set to 0. |

FIG. 14B

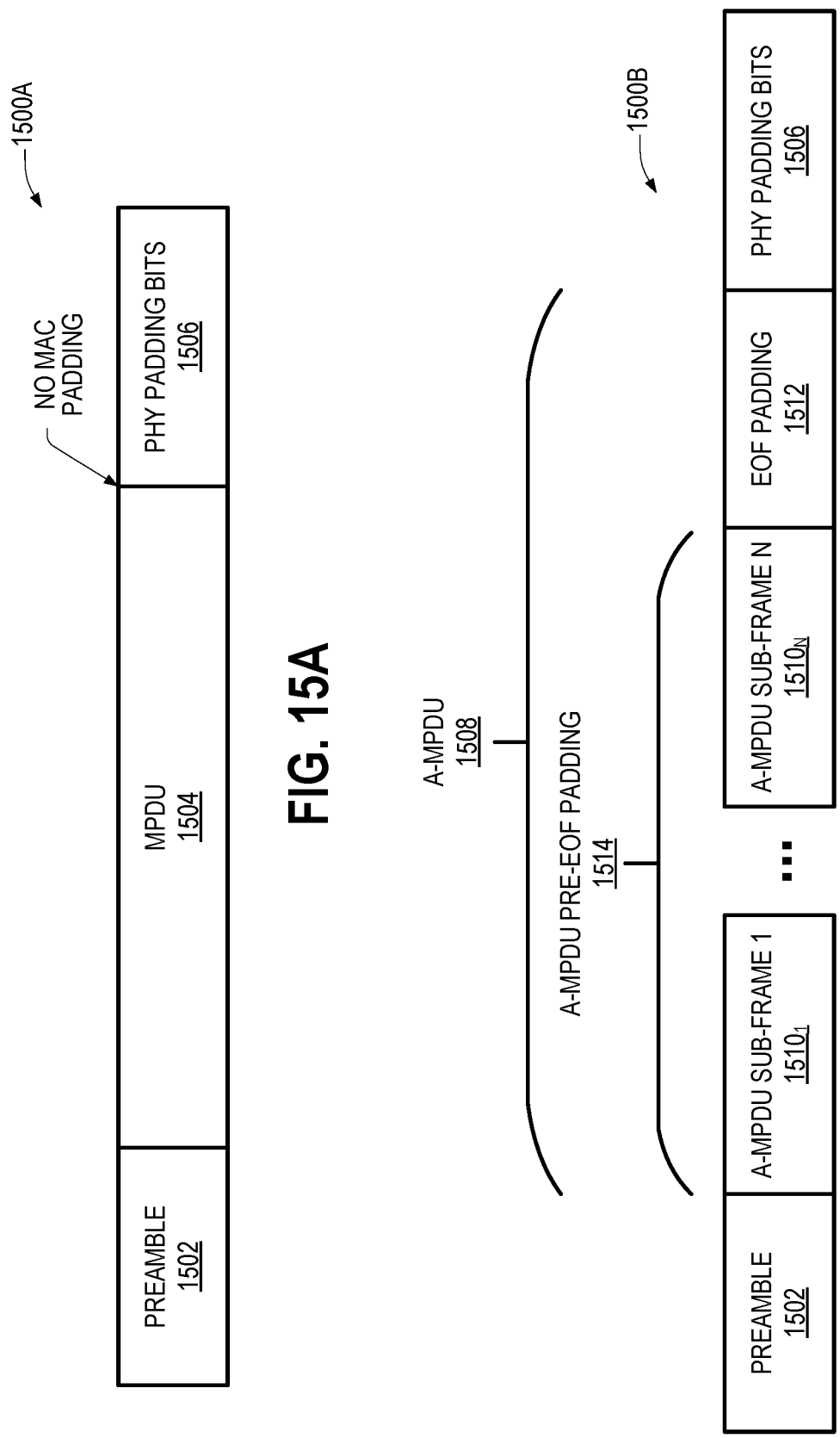

| Parameter | Condition | Value | TXVECTOR | RXVECTOR |
|---|---|---|---|---|
| PSDU_LENGTH | FORMAT is S1G and (CH_BANDWIDTH equals CBW2 or CBW4 or CBW8 or CBW16) and MU_SU equals MU | If greater than 0 in the RXVECTOR, this parameter is the value obtained from 23.4.3 (TXTIME and PSDU_LENGTH calculation) | N | Y |
| | Otherwise | If greater than 0 in the TXVECTOR, indicate the number of octets in the PSDU. If greater than 0 in the RXVECTOR, this parameter is the value obtained from 23.4.3 (TXTIME and PSDU_LENGTH calculation). A value of 0 indicates an S1G NDP PPDU for both RXVECTOR and TXVECTOR. | Y | Y |

FIG. 16

| Condition | PARTIAL_AID |
|---|---|
| A frame that is addressed to an AP or sent by an AP as a broadcast address | $BSSID[39:47] mod(2^9 - 1) + 1$ |
| A frame that is sent by an AP and addressed to a STA associated with that AP or sent by a TDLS STA in a direct path to a TDLS peer STA, or to a group of STAs with a common group AID and a common BSSID | $(AID[0:8] + 2^5 \times BSSID[44:47] \oplus BSSID[40:43]) mod\ 2^9$    (10-13) |
| Otherwise | 0 |

FIG. 17

DETERMINING THE NUMBER OF SYMBOLS IN A DATA FIELD OF A FRAME BASED ON AGGREGATION

CROSS-REFERENCE TO RELATED APPLICATION

This application is a continuation of U.S. application Ser. No. 17/451,313 filed Oct. 18, 2021 (issued as U.S. Pat. No. 11,844,148 on Dec. 12, 2023), which is a continuation of U.S. application Ser. No. 16/457,208 filed Jun. 28, 2019 (issued as U.S. Pat. No. 11,184,948 on Nov. 23, 2021), which claims the benefit of U.S. Provisional Application No. 62/691,494 filed Jun. 28, 2018, which are incorporated by reference herein in their entirety.

TECHNICAL FIELD

The present disclosure generally relates to wireless communications, and more specifically, relates to determining the number of symbols in a data field of a frame based on use of aggregation in the frame.

BACKGROUND ART

The Institute of Electrical and Electronics Engineers (IEEE) 802.11ah Task Group has developed an amendment to the 802.11 standard targeting Internet of Things (IoT) applications and extended range (ER) applications by defining sub-1-GHz (S1G) license-exempt operations. IoT applications are considered the next major growth area for the wireless industry of home appliances, industrial automation, asset tracking, healthcare, energy management, and wearable devices. Although S1G bands have more limited frequency spectrum available in comparison to than 2.4 and 5 GHz industrial, scientific, and medical (ISM) radio bands, the basic assumption is that the limited frequency spectrum offered by S1G will be sufficient for low data rate applications (e.g. IoT applications) as these applications typically transmit small amounts of data infrequently. Moreover, since the 915 MHz ISM band (e.g., 902-928 MHz) has 8.5 dB less free space propagation loss than the 2.4 GHz ISM band, this could enhance either the link budget between devices or long-range transmission distance in outdoor scenarios. Those properties can help reduce energy consumption of a device by lowering transmit power as well.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows characteristics of IEEE 802.11ah, in accordance with some embodiments of the present disclosure.

FIG. 7A shows a short preamble frame format, in accordance with some embodiments of the present disclosure.

FIG. 7B shows a long preamble frame format, in accordance with some embodiments of the present disclosure.

FIG. 7C shows a 1 MHz (1M) preamble frame format, in accordance with some embodiments of the present disclosure.

FIG. 8 shows descriptions of elements of the short, long, and 1M frame formats, in accordance with some embodiments of the present disclosure.

FIG. 10A shows descriptions of fields of the first symbol of the signal field for the short preamble frame format, in accordance with some embodiments of the present disclosure.

FIG. 10B shows descriptions of fields of the second symbol of the signal field for the short preamble frame format, in accordance with some embodiments of the present disclosure.

FIG. 12A shows descriptions of fields of the first symbol of the signal-A field in a single user transmission for the long preamble frame format, in accordance with some embodiments of the present disclosure.

FIG. 12B shows descriptions of fields of the second symbol of the signal-A field in a single user transmission for the long preamble frame format, in accordance with some embodiments of the present disclosure.

FIG. 14A shows descriptions of fields of the first symbol of the signal field in a multi-user transmission for the long frame format, in accordance with some embodiments of the present disclosure.

FIG. 14B shows descriptions of fields of the second symbol of the signal field in a multi-user transmission for the long frame format, in accordance with some embodiments of the present disclosure.

FIG. 15A shows a PPDU without aggregation, in accordance with some embodiments of the present disclosure.

FIG. 15B shows a PPDU with aggregation, in accordance with some embodiments of the present disclosure.

FIG. 16 shows a definition for a PSDU_LENGTH parameter, in accordance with some embodiments of the present disclosure.

FIG. 17 shows a definition for a PARTIAL_AID parameter, in accordance with some embodiments of the present disclosure.

DETAILED DESCRIPTION

Figure 1:
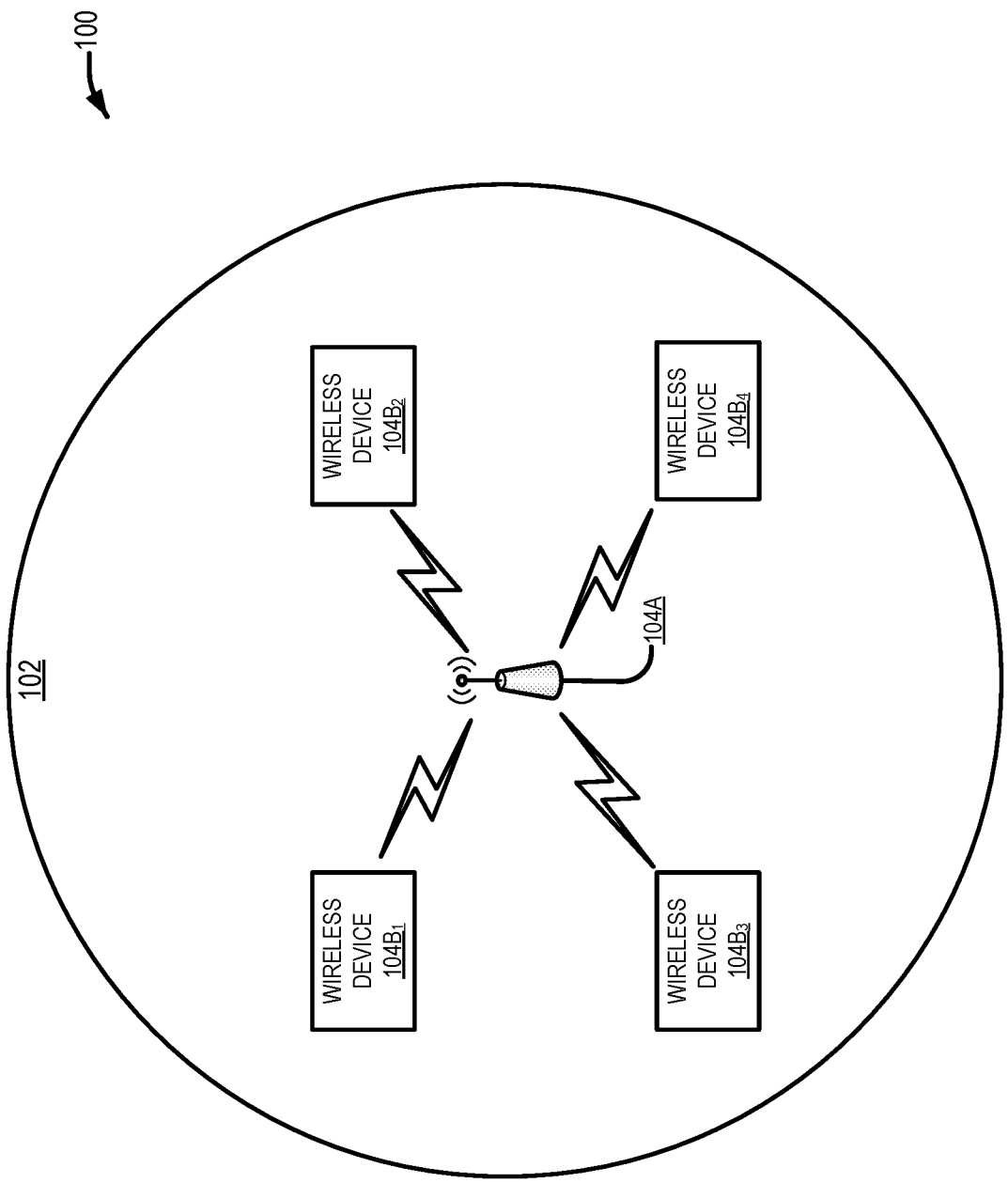
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to determining the number of symbols in a data field of a frame based on aggregation used by the frame.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11. In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate a RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104B 1-104B 4 that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104B 1-104B 4) may be collectively referred to as STAs. However, for ease of description, only the non-AP STAs may be referred to as STAs. Although shown with four non-AP STAs (e.g., the wireless devices $104B_1$-$104B_4$), the WLAN 100 may include any number of non-AP STAs (e.g., one or more wireless devices 104B).

Figure 2:
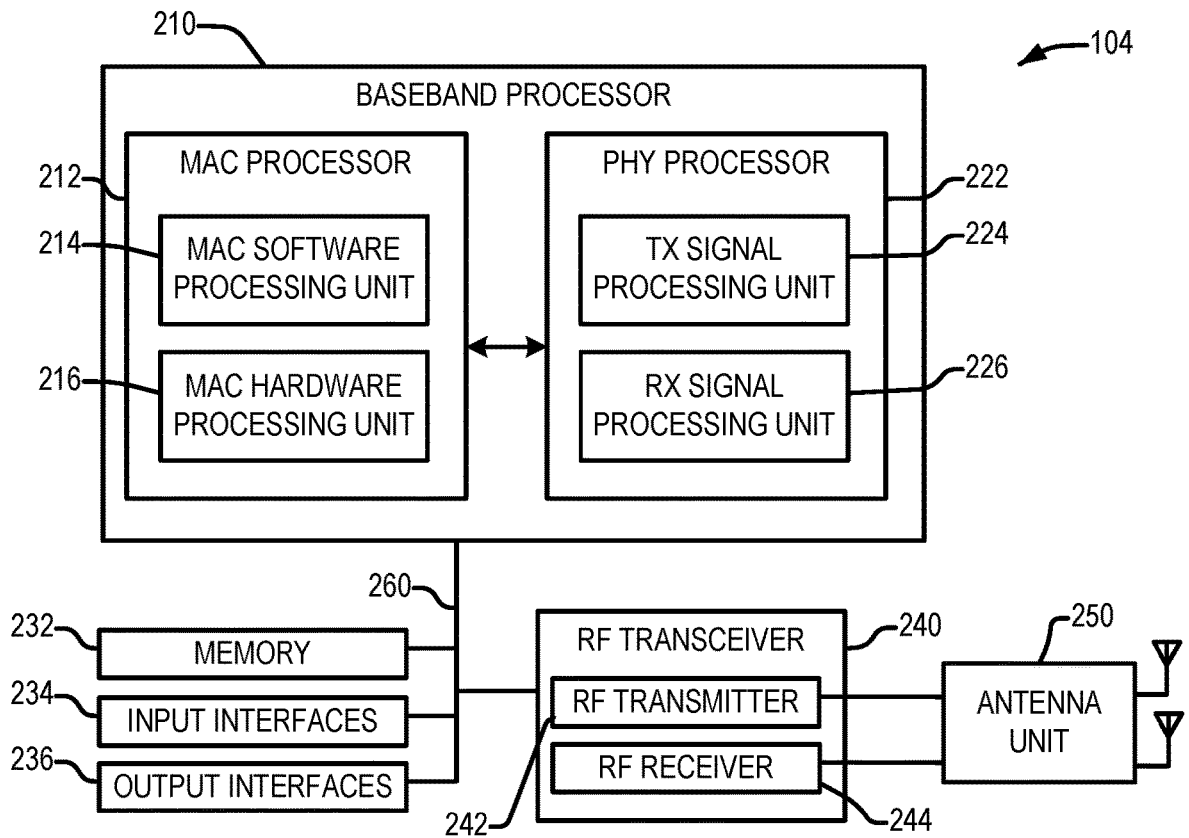
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104B 1-104B 4 in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
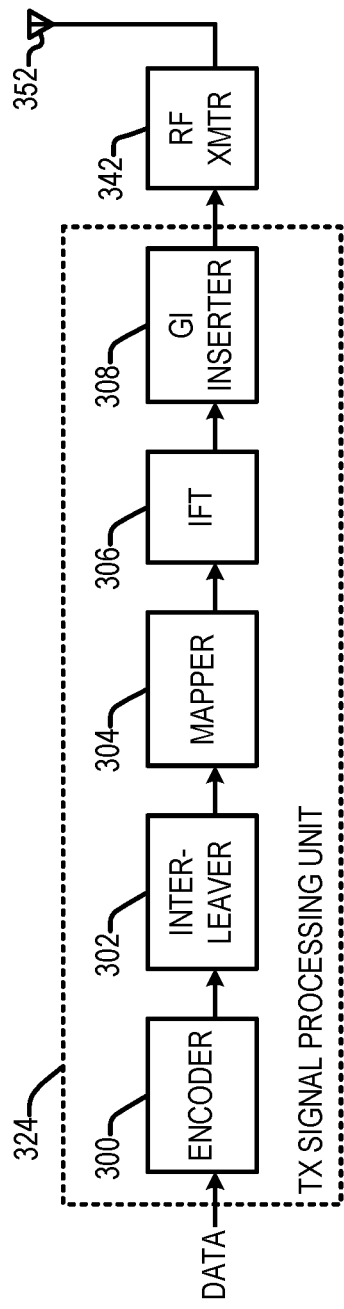
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
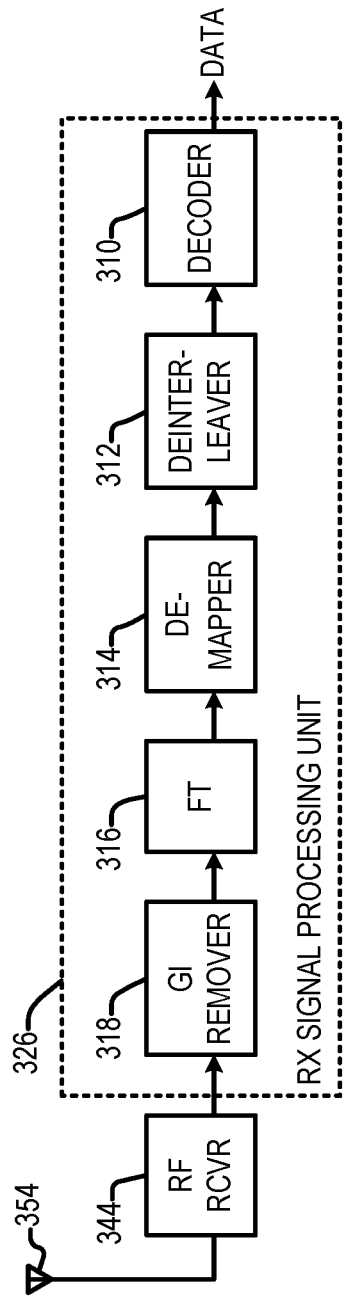
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, and 160 MHz contiguous channel widths and support for an 80+80 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
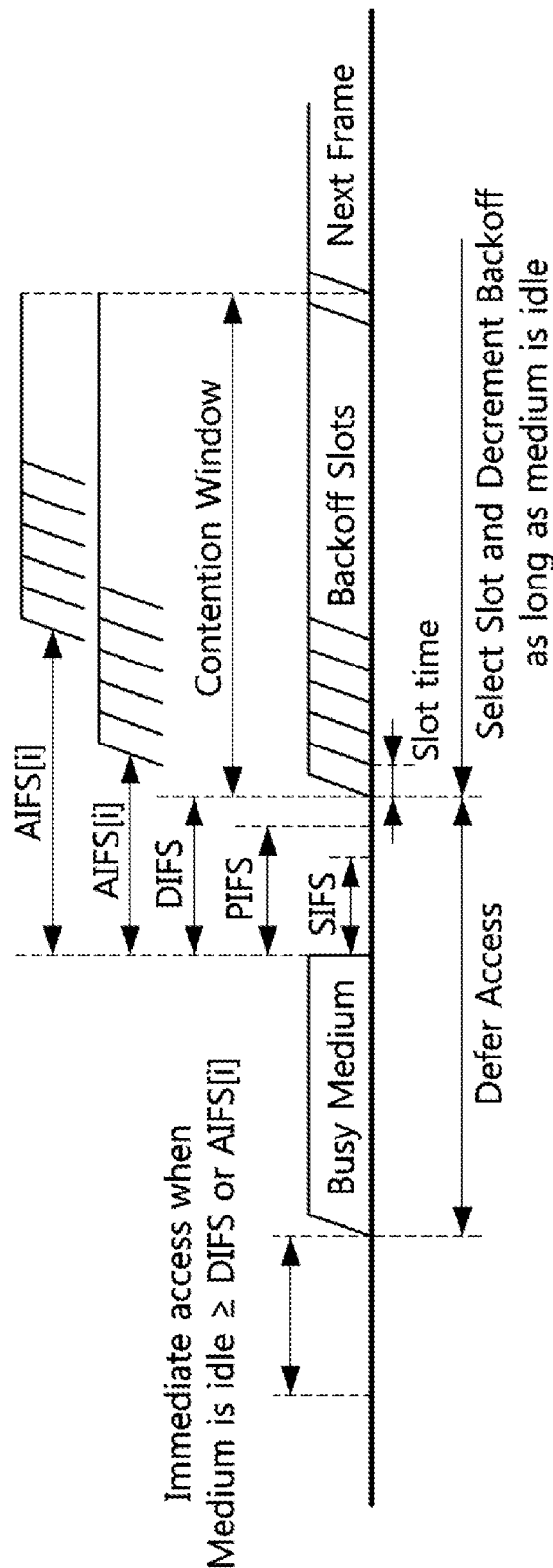
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFS s corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
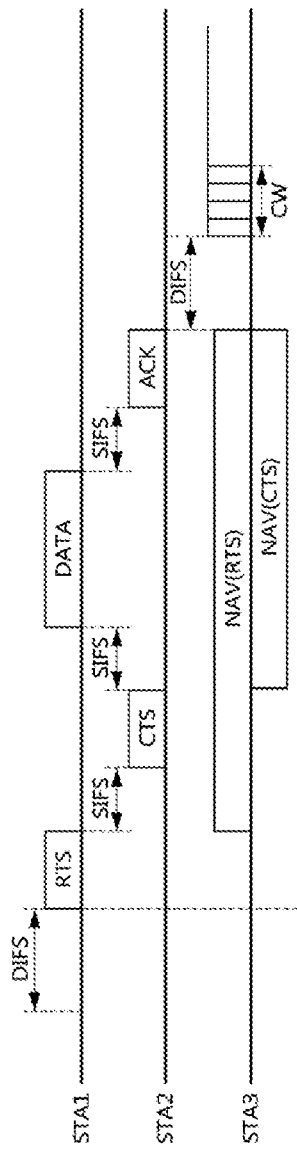
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

As noted above, the Institute of Electrical and Electronics Engineers (IEEE) 802.11ah Task Group is developing an amendment to the IEEE 802.11 standard. This amendment (sometimes referred to as IEEE 802.11ah) defines a wireless networking protocol with a number of characteristics, including those described in the table shown in FIG. 6.

IEEE 802.11ah defines three sub-1-GHz (S1G) physical layer frame formats (sometimes referred to as PPDU formats). Those formats include a short preamble frame format (sometimes referred to as S1G_SHORT), a long preamble frame format (sometimes referred to as S1G_LONG) and a 1 MHz (1M) frame format (S1G_1M). FIGS. 7A-7C show these three frame formats 700A-700C, respectively, and FIG. 8 provides descriptions of elements of the three frame formats 700A-700C. As shown in FIG. 7A, the short preamble frame format (S1G_SHORT) 700A includes two symbols for a short training field (STF) 702A; two symbols for a first long training field (LTF) (e.g., LTF1) $704A_1$, which is composed of a double guard interval (GI2) 710A and two long training symbol (LTSs) $712A_1$ and $712A_2$; two symbols for a signal field (SIG) 706A; an additional set of $N_{LTF}$-1 LTFs (e.g., LTF2-LTFN$_{LTF}$) $704A_{2\_NLTF}$ that each are a symbol in length; and a data field (e.g., DATA) 708A.

As shown in FIG. 7B, the long preamble frame format (S1G_LONG) 700B is composed of an omnidirectional portion 716A and a beamchangeable portion 716B. The omnidirectional portion 716A includes two symbols for an STF 702B; two symbols for a first LTF (e.g., LTF1) $704B_1$, which is composed of a double guard interval (GI2) 710B and two LTSs $712B_1$ and $712B_2$; and two symbols for a signal-A field (SIG-A) 706B. The beamchangeable portion 716B includes one symbol for an STF (e.g., a D-STF) 714B, and an additional set of $N_{LTF}$-1 LTFs (e.g., D-LTF2-D-LTFN$_{LTF}$) $704B_{2\text{-}NLTF}$ that each are a symbol in length; one symbol for a signal-B field (SIG-B) 718B and a data field (e.g., DATA) 708B.

As shown in FIG. 7C, the 1M frame format (S1G_1M) 700C includes four symbols for a STF 702C; four symbols for a first LTF (e.g., LTF1) $704C_1$; six symbols for a signal field (SIG) 706C; an additional set of $N_{LTF}$-1 LTFs (e.g., LTF2-LTFN$_{LTF}$) $704C_{2\text{-}NLTF}$ that each are a symbol in length; and a data field (e.g., DATA) 708C. As also shown in FIG. 7C, the first LTF (e.g., LTF1) $704C_1$ includes the pattern of a double guard interval (GI2) $710C_1$, two LTSs $712C_1$ and $712C_2$, a GI $710C_2$, an LTS $712C_3$, a GI $710C_3$, and an LTS $712C_4$.

Figure 9A:
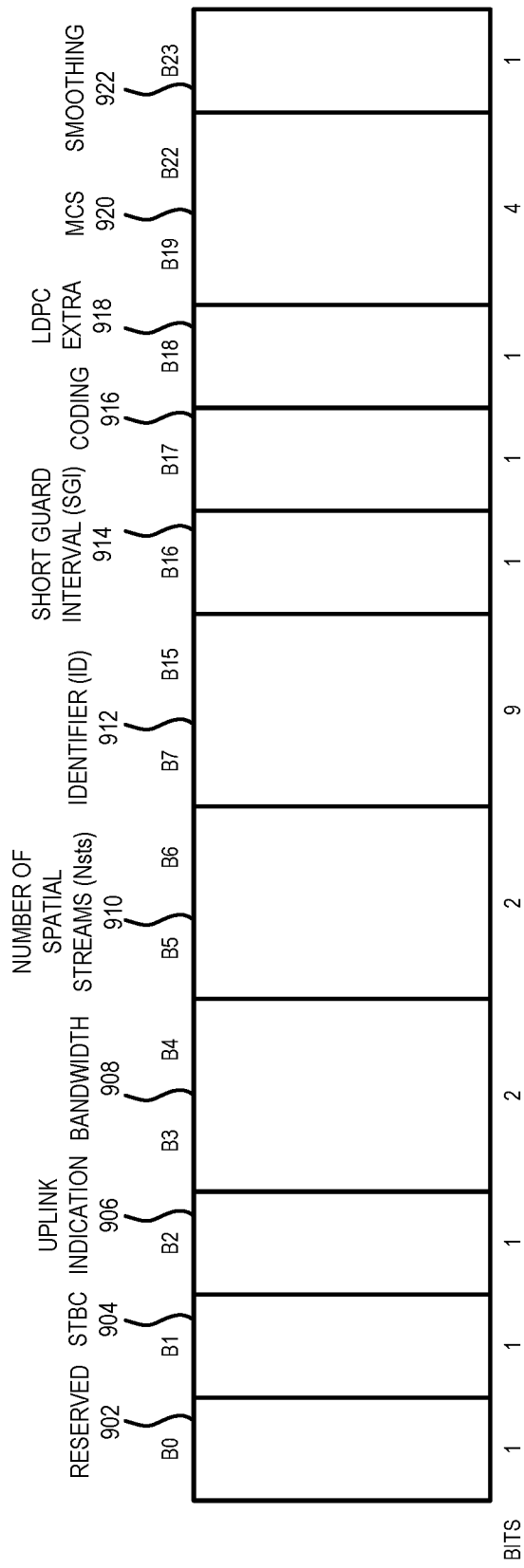
FIG. 9A shows the structure for the first symbol of a signal field for the short preamble frame format, in accordance with some embodiments of the present disclosure.
Figure 9B:
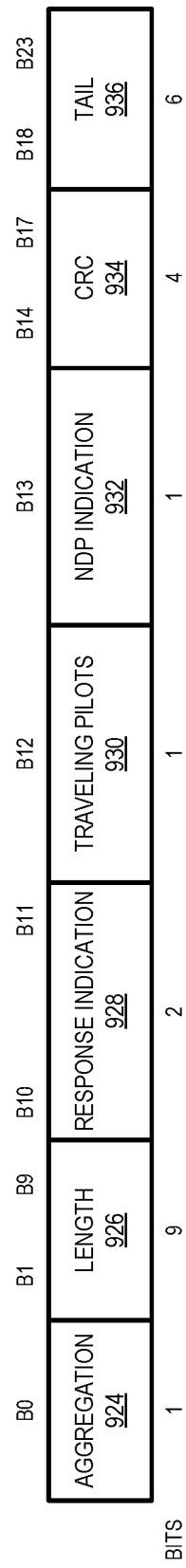
FIG. 9B shows the structure for the second symbol of the signal field for the short preamble frame format, in accordance with some embodiments of the present disclosure.

Control information included in SIG fields 706A and 706C or SIG-A field 706B is described below. In particular, the SIG fields 706A carry information used by a receiving WLAN device 104 for interpreting S1G format PPDUs 700 sent with a short preamble (e.g., S1G_SHORT). The structure of the SIG field 706A for the first symbol (SIG-1) is shown in FIG. 9A and for the second symbol (SIG-2) is shown in FIG. 9B, with corresponding descriptions of the fields for the first symbol (SIG-1) in FIG. 10A and for the second symbol (SIG-2) shown in FIG. 10B (all references therein are to the IEEE 802.11ah standard). For example, as shown in FIG. 9A, the first symbol (SIG-1) of the SIG field 706A includes one bit for a reserved field 902, one bit for a space time block coding (STBC) field 904, one bit for an uplink indication field 906, two bits for a bandwidth (BW) field 908, two bits for a number of spatial streams field (Nsts) 910, nine bits for an identifier (ID) field 912, a short guard interval (SGI) field 914, one bit for a coding field 916, one bit for an LDPC extra field 918, a modulation and coding scheme (MCS) field 920, and a smoothing field 922. As shown in FIG. 9B, the second symbol (SIG-2) of the SIG field 706A includes one bit for an aggregation field 924, nine bits for a length field 926, two bits for a response indication field 928, one bit for a traveling pilots field 930, one bit for a null data packet (NDP) field 932, four bits for a cyclic redundancy check (CRC) field 934, and six bits for a tail field 936.

Figure 11A:
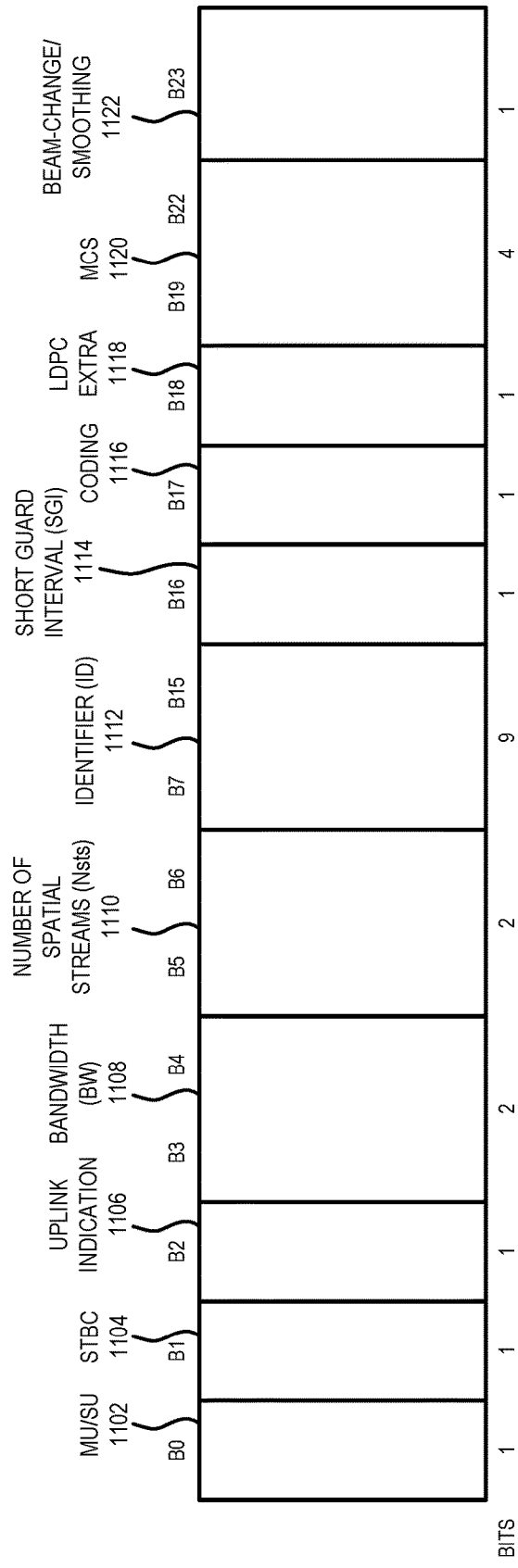
FIG. 11A shows the structure for the first symbol of a signal-A field in a single user transmission for the long preamble frame format, in accordance with some embodiments of the present disclosure.
Figure 11B:
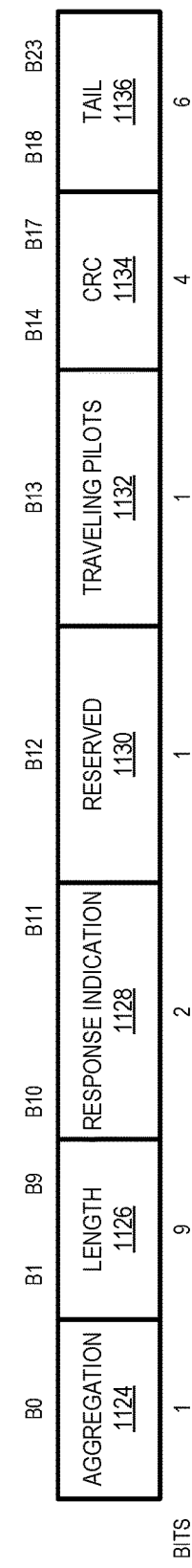
FIG. 11B shows the structure for the second symbol of the signal-A field in a single user transmission for the long preamble frame format, in accordance with some embodiments of the present disclosure.

In contrast to the SIG field 706A that carries information used by a receiving WLAN device 104 for interpreting S1G format PPDUs 700 sent with a short preamble (e.g., S1G_SHORT), the SIG-A field 706B carries information used by a receiving WLAN device 104 for interpreting S1G format PPDUs 700 sent using a long preamble (e.g., SIG_LONG). In some embodiments, the structure of the SIG-A field 706B is different for single user (SU) PPDUs and multi-user (MU) PPDUs. The structure of the SIG-A field 706B for SU PPDUs for the first symbol (SIG-A1) is shown in FIG. 11A and for the second symbol (SIG-A2) is shown in FIG. 11B, with corresponding descriptions of the fields for the first symbol (SIG-A1) in FIG. 12A and for the second symbol (SIG-A2) shown in FIG. 12B (all references therein are to the IEEE 802.11ah standard). In particular, as shown in FIG. 11A, the first symbol (SIG-A1) of the SIG-A field 706B for SU PPDUs includes one bit for a MU/SU field 1102, one bit for a space time block coding (STBC) field 1104, one bit for an uplink indication field 1106, two bits for a bandwidth (BW) field 1108, two bits for a number of spatial streams field (Nsts) 1110, nine bits for an identifier (ID) field 1112, one bit for a short guard interval (SGI) field 1114, one bit for a coding field 1116, one bit for an LDPC extra field 1118, four bits for a modulation and coding scheme (MCS) field 1120, and one bit for a beamchange/smoothing field 1122. As shown in FIG. 11B, the second symbol (SIG-A2) of the SIG-A field 706B for SU PPDUs includes one bit for an aggregation field 1124, nine bits for a length field 1126, two bits for a response indication field 1128, one bit for a reserved field 1130, one bit for a traveling pilots field 1132, four bits for a cyclic redundancy check (CRC) field 1134, and six bits for a tail field 1136.

Figure 13A:
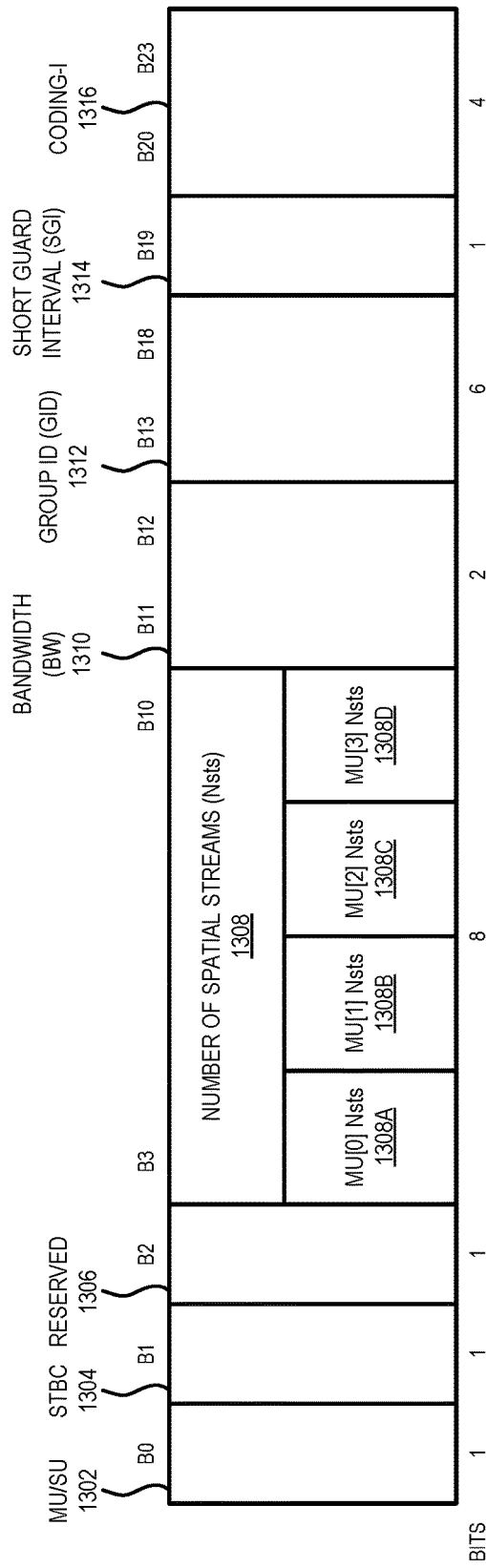
FIG. 13A shows the structure for the first symbol of a signal-A field in a multi-user transmission for the long frame format, in accordance with some embodiments of the present disclosure.
Figure 13B:
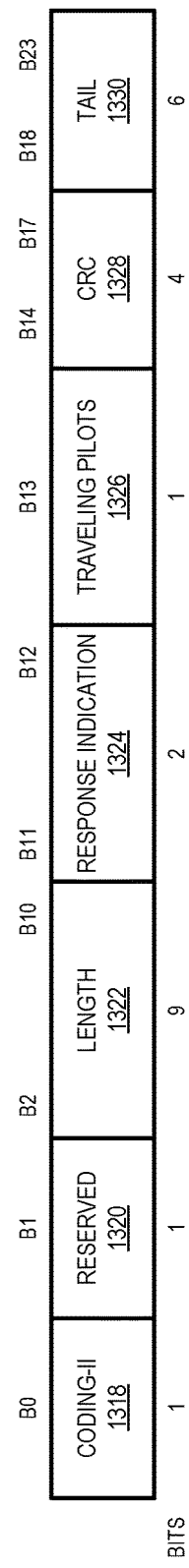
FIG. 13B shows the structure for the second symbol of the signal field in a multi-user transmission for the long frame format, in accordance with some embodiments of the present disclosure.

The structure of the SIG-A field 706B for MU PPDUs for the first symbol (SIG-A1) is shown in FIG. 13A and for the second symbol (SIG-A2) is shown in FIG. 13B, with corresponding descriptions of the fields for the first symbol (SIG-A1) in FIG. 14A and for the second symbol (SIG-A2) shown in FIG. 14B (all references therein are to the IEEE 802.11ah standard). In particular, as shown in FIG. 13A, the first symbol (SIG-A1) of the SIG-A field 706B for MU PPDUs includes one bit for a MU/SU field 1302, one bit for a space time block coding (STBC) field 1304, one bit for a reserved field 1306, a set of eight bits for a number of spatial streams field (Nsts) 1308A-1308D for a set of users, two bits for a bandwidth (BW) field 1310, six bits for a group identifier (GID) field 1312, one bit for a short guard interval (SGI) field 1314, and one bit for a first coding field 1316.

As shown in FIG. 13B, the second symbol (SIG-A2) of the SIG-A field 706B for MU PPDUs includes one bit for a second coding field 1318, one bit for a reserved field 1320, nine bits for a length field 1322, two bits for a response indication field 1324, one bit for a traveling pilots field 1326, four bits for a cyclic redundancy check (CRC) field 1328, and six bits for a tail field 1330.

In one embodiment, a transmitting WLAN device 104 (sometimes referred to as a transmitting STA) and/or a receiving WLAN device 104 (sometimes referred to as the receiving STA) determines the number of data symbols in the data field 708 of the frame 700 ($N_{SYM}$). For example, one of the WLAN devices 104 of the WLAN 100 of FIG. 1 determines the number of symbols in the data field 708 of a frame 700 prior to generating and transmitting the frame 700 or during the processing of a received frame 700. In one embodiment, for a S1G SU PPDU that uses binary convolutional coding (BCC), the total number of data symbols ($N_{SYM}$) in the data field 708 of the frame 700 can be calculated as shown in the below Equation 1.

$$N_{SYM} = m_{STBC} \times \left\lceil \frac{8 \cdot \text{APEP\_LENGTH} + N_{service} + N_{tail} \cdot N_{ES}}{m_{STBC} \cdot N_{DBPS}} \right\rceil \quad \text{Equation 1}$$

Similarly, for a S1G SU PPDU that uses low-density parity-check (LDPC) coding, the total number of data symbols ($N_{SYM}$) in the data field 708 of the frame 700 can be calculated as shown in the below Equation 2.

$$N_{SYM} = m_{STBC} \times \left\lceil \frac{8 \cdot \text{APEP\_LENGTH} + N_{service}}{m_{STBC} \cdot N_{DBPS}} \right\rceil \quad \text{Equation 2}$$

In Equations 1 and 2, $N_{SYM}$ is the total number of data symbols in the data field 708 of the frame 700, $m_{STBC}$ is set equal to two when a space-time block coding (STBC) is used and otherwise is set equal to one, $N_{service}$ and $N_{tail}$ respectively indicate the number of service bits and the number of tail bits to be used or used for encoding data of the data field 708, N E s indicates the number of BCC encoders used for encoding the data field 708, $N_{DBPS}$ indicates the number of data bits per OFDM symbol of the data field 708.

Looking at the APEP_LENGTH parameter, the value for this parameter is delivered from the MAC layer to the PHY layer via a TXVECTOR. When the value for APEP_LENGTH parameter is greater than 0 in the TXVECTOR, this indicates the number of octets in an A-MPDU pre-EOF (end-of-frame) padding carried in the PSDU. In particular, this parameter is used to determine the number of OFDM symbols in the data field 708 that do not appear after a subframe with 1 in the EOF subfield for a scenario where aggregation is utilized. By relying only on APEP_LENGTH parameter to calculate the total number of data symbols ($N_{SYM}$) in the data field 708 of the frame 700, this suggests that IEEE 802.11ah only supports an A-MPDU format in the data field 708. However, if the TXVECTOR indicates MPDU frame aggregation is not utilized (e.g., the AGGREGATION field of the TXVECTOR is set to NOT_AGGREGATED), this indicates that that the frame 700 does not utilize A-MPDU aggregation.

In particular, IEEE 802.11ah provides for S1G PPDUs 700 with either an MPDU (as shown in FIG. 15A) or an A-MPDU, including a set of A-MPDU sub-frames (as shown in FIG. 15B). In particular, as shown in FIG. 15A, the PPDU 1500A includes a preamble 1502, an MPDU 1504, and PHY padding bits 1506. Accordingly, in the PPDU 1500A of FIG. 15A, no EOF padding (i.e., MAC padding) is used and the PHY layer directly appends PHY padding bits 1506 to the PSDU (i.e., the MPDU). In this case, the PSDU length (i.e., the PSDU_LENGTH that is indicated in the TXVECTOR or an RXVECTOR) has a value equal to the length of the MPDU 1504.

As shown in FIG. 15B, the PPDU 1500B includes a preamble 1502, an A-MPDU 1508 (including a set of A-MPDU sub-frames $1510_1$-$1510_N$), EOF padding 1512 (i.e., MAC padding), and PHY padding bits 1506. In this case, the EOF padding 1512 is an A-MPDU subframe 1510 with a length field having a value of 0. Further, the A-MPDU pre-EOF padding 1514 refers to the contents of the A-MPDU 1508 up to, but not including, the EOF padding 1512, and is indicated in the TXVECTOR as the using the APEP_LENGTH parameter. In this case, PSDU length (i.e., the PSDU_LENGTH parameter that is indicated in a TXVECTOR or an RXVECTOR) has a value equal to the APEP_LENGTH parameter and EOF padding 1512 (i.e., MAC padding).

To account for both S1G PPDUs 700 that use aggregation (e.g., the PPDU 1500B) and S1G PPDUs 700 that don't use aggregation (e.g., the PPDU 1500A), several techniques are provided. In one of embodiment, the definition of the APEP_LENGTH parameter could be extended to indicate both (1) a length of A-MPDU pre-EOF padding for S1G PPDUs 700 that include an A-MPDU (i.e., PPDUs that utilize aggregation) and (2) a length of an MPDU for S1G PPDUs 700 that include an MPDUs (i.e., PPDUs that do not utilize aggregation). For example, the APEP_LENGTH parameter is set equal to 0 in a RXVECTOR or a TXVECTOR to indicate a S1G null data packet (NDP) PPDU. However, when the APEP_LENGTH parameter is greater than 0, this indicates the number of octets in the MPDU or the A-MPDU pre-EOF padding carried in the PSDU. The APEP_LENGTH parameter is used to determine the number of OFDM symbols in the data field 708 that do not appear after an aggregation subframe, if present, with 1 in the EOF subfield. However, given the definition of the APEP_LENGTH parameter as the length of A-MPDU Pre-EOF padding in IEEE standards, it might be prudent to not change the definition of the APEP_LENGTH parameter.

In another embodiment, the APEP_LENGTH parameter of the TXVECTOR or the RXVECTOR is only used for determining the number of data symbols ($N_{SYM}$) in the data field 708 of a frame 700 when an A-MPDU is present in the frame 700 (i.e., aggregation is employed by the frame 700) and otherwise the PSDU_LENGTH parameter of the TXVECTOR or RXVECTOR is used for non-aggregation scenarios where an MPDU is present in the frame 700. In one embodiment, the PSDU_LENGTH parameter in the TXVECTOR and/or RXVECTOR is defined as follows: (1) If PSDU_LENGTH parameter is greater than 0 in the TXVECTOR, it indicates the number of octets in the PSDU; (2) if PSDU_LENGTH parameter is greater than 0 in the RXVECTOR, this parameter is the value obtained based on a calculation described below; and (3) a value of 0 for PSDU_LENGTH parameter indicates an S1G NDP PPDU for both the RXVECTOR and the TXVECTOR. The above definitions for the PSDU_LENGTH parameter are shown in FIG. 16, described below, and, in some embodiments, are limited to SU PPDUs (all references therein are to the IEEE 802.11ah standard).

In one of embodiment, a WLAN device 104 transmitting an S1G NDP sounding frame 700 uses the following TXVECTOR parameters: (1) the APEP_LENGTH parameter is set to 0 if the aggregation bit in its SIG field 706A/706C or SIG-A field 706B is to be set equal to 1; (2) the PSDU_LENGTH parameter is set to 0 if the aggregation bit is to be set equal to 0; (3) a NUM_USERS parameter, which indicates the number of users/target WLAN devices 104 of the frame 700, is set to 1 to indicate the frame 700 is an SU frame; (4) a CH_BANDWIDTH parameter, which indicates the bandwidth of the frame 700, is set to the same value as the CH_BANDWIDTH parameter of the TXVECTOR for the preceding S1G NDP Announcement frame, which announces the commencement of a sounding procedure; (5) a NUM_STS parameter, which indicates the number of space-time streams, is set to indicate two or more space-time streams; (6) a PARTIAL_AID parameter is set as shown in FIG. 17 (all references therein are to the IEEE 802.11ah standard); (7) a NDP_INDICATION parameter is set to 0; and (8) a RESPONSE_INDICATION parameter is set to indicate a long response.

As described above, in some embodiments, the APEP_LENGTH parameter may be used for determining the number of data symbols ($N_{SYM}$) in the data field 708 of the frame 700 when aggregation is used and the PSDU_LENGTH parameter may be used for determining the number of data symbols ($N_{SYM}$) in the data field 708 of the frame 700 when aggregation is not used. For example, for a S1G SU PPDU 700, the total number of data symbols ($N_{SYM}$) in the data field 708 of the frame 700 can be calculated as shown in Equation 1 above when the aggregation bit (i.e., the aggregation field 924/1124) in the SIG field 706A/706C or SIG-A field 706B is set equal to 1 and BCC coding is used. In contrast, for a S1G SU PPDU 700, the total number of data symbols ($N_{SYM}$) in the data field 708 of the frame 700 can be calculated as shown in Equation 3 below when the aggregation bit in the SIG field 706A/706C or SIG-A field 706B is set equal to 0 and BCC coding is used.

$$N_{SYM} = m_{STBC} \times \left\lceil \frac{8 \cdot \text{PSDU\_LENGTH} + N_{service} + N_{tail} \cdot N_{ES}}{m_{STBC} \cdot N_{DBPS}} \right\rceil \quad \text{Equation 3}$$

In Equation 3, $N_{SYM}$ is the total number of data symbols in the data field 708 of the frame 700, $m_{STBC}$ is set equal to two when a space-time block coding (STBC) is used and otherwise is set equal to one, $N_{service}$ and $N_{tail}$ respectively indicate the number of service bits and the number of tail bits to be used or used for encoding data of the data field 708, $N_{ES}$ indicates the number of BCC encoders, $N_{DBPS}$ indicates the number of data bits per OFDM symbol of the data field 708, and PSDU_LENGTH is the length of an MPDU in the PPDU.

For an S1G MU PPDU 700, the total number of data symbols ($N_{SYM}$) in the data field 708 is given by Equation 4 below.

$$N_{SYM} = \max\{N_{SYM,u}\}_{u=0}^{N_{user}-1} \quad \text{Equation 4}$$

In Equation 4, $N_{SYM,u}$ is defined by Equation 1 above by replacing $N_{SYM}$, APEP_LENGTH, $N_{ES}$, and $N_{DBPS}$ with $N_{SYM,u}$, APEP_LENGTH$_u$, $N_{ES,u}$, and $N_{DBPS,u}$ for BCC and for LDPC. For example, $N_{ES,u}$ is used in place of $N_{ES}$ for user u and $N_{DBPS,u}$ is used in place of $N_{DBPS}$ for user u.

The value of the PSDU_LENGTH parameter returned in the PLME-TXTIME.confirm primitive for an S1G SU PPDU 700 using BCC encoding is calculated using Equation 5 below.

$$\text{PSDU\_LENGTH} = \left\lfloor \frac{N_{SYM,init} \cdot N_{DBPS} - N_{service}}{8} \right\rfloor \quad \text{Equation 5}$$

In Equation 5 above, $N_{SYM,init}$ is given by Equation 6 or Equation 7 below based on whether aggregation is employed.

$$N_{SYM,init} = m_{STBC} \times \left\lceil \frac{8 \cdot \text{APEP\_LENGTH} + N_{service}}{m_{STBC} \cdot N_{DBPS}} \right\rceil \quad \text{Equation 6}$$

$$N_{SYM,init} = m_{STBC} \times \left\lceil \frac{8 \cdot \text{PSDU\_LENGTH} + N_{service}}{m_{STBC} \cdot N_{DBPS}} \right\rceil \quad \text{Equation 7}$$

In Equations 6 and 7 above, $m_{STBC}$ is equal to 2 when STBC is used and is equal to 1 otherwise. APEP_LENGTH is the value of the APEP_LENGTH parameter in the TXVECTOR while PSDU_LENGTH is the value of the PSDU_LENGTH parameter in the TXVECTOR.

The value of the PSDU_LENGTH parameter for user u returned in the PLME-TXTIME.confirm primitive and in the RXVECTOR for an S1G MU PPDU 700 may be calculated using Equation 8 below.

$$\text{PSDU\_LENGTH}_u = \quad \text{Equation 8}$$

$$\begin{cases} \left\lfloor \dfrac{N_{SYM} \cdot N_{DBPS,u} - N_{service} - N_{tail}N_{ES,u}}{8} \right\rfloor & \text{when } BCC \text{ is used for user } u \\ \left\lfloor \dfrac{N_{SYM\_max\_init} \cdot N_{DBPS,u} - N_{service}}{8} \right\rfloor & \text{when } LDPC \text{ is used for user } u \end{cases}$$

In Equation 8 above, $N_{SYM\_max\_init}$ is given by Equation 9, below, and $N_{DBPS,u}$ and $N_{ES,u}$ are for user u.

$$N_{SYM\_max\_init} = \max\{N_{SYM\_init,u}\}_{u=0}^{N_{user}-1} \quad \text{Equation 9}$$

In Equation 9 above, $N_{SYM\_init,u}$ is given by Equation 10 below.

$$\text{Equation 10}$$

$$N_{SYM\_init,u} =$$

$$\begin{cases} \left\lceil \dfrac{8 \cdot \text{APEP\_LENGTH} + N_{service} + N_{tail} \cdot N_{ES,u}}{N_{DBPS,u}} \right\rceil & \text{when } BCC \text{ is used for user } u \\ \left\lceil \dfrac{8 \cdot \text{APEP\_LENGTH} + N_{service}}{N_{DBPS,u}} \right\rceil & \text{when } LDPC \text{ is used for user } u \end{cases}$$

Figure 18:
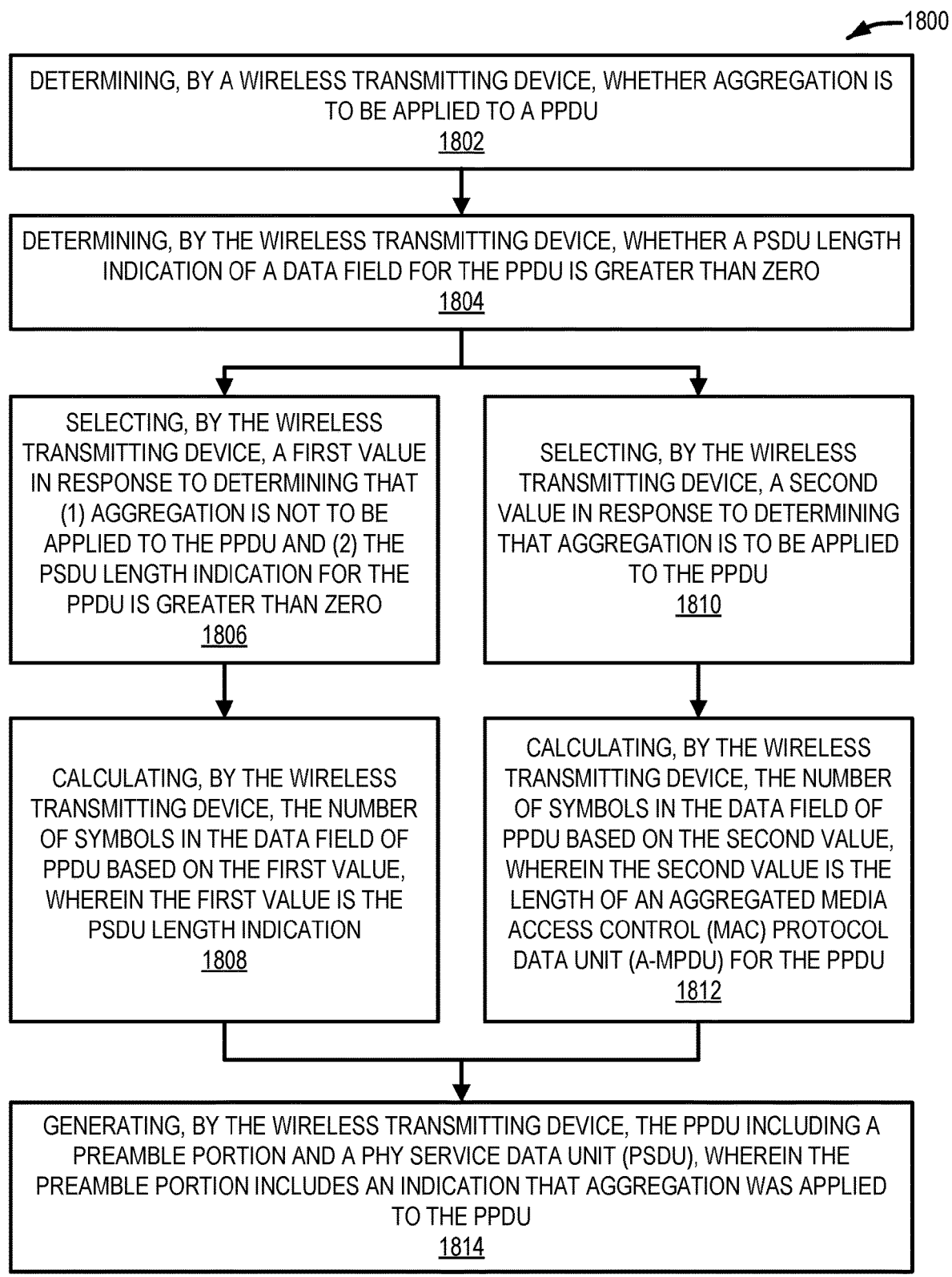
FIG. 18 shows a method for determining a number of symbols in a data field of a physical layer (PHY) protocol data unit (PPDU), in accordance with an example embodiment.

Turning now to FIG. 18, a method 1800 will be described for determining a number of symbols ($N_{SYM}$) in a data field 708 of a physical layer (PHY) protocol data unit (PPDU) 700, in accordance with an example embodiment. The method 1800 may be performed by one or more devices described herein. For example, the method 1800 may be performed by a WLAN device 104. Additionally, although shown in a particular order, in some embodiments the operations of the method 1800 may be performed in a different order. For example, although the operations of the method 1800 are shown in a sequential order, some of the operations may be performed in partially or entirely overlapping time periods.

As shown in FIG. 18, the method 1800 may commence at operation 1802 with a wireless transmitting device (e.g., a WLAN device 104) determining whether aggregation is to be applied to the PPDU 700. For example, the wireless transmitting device may determine that aggregation is to be applied to the PPDU 700 based on an AGGREGATION parameter in a TXVECTOR, and the TXVECTOR is passed from a MAC layer of the transmitting device to a PHY layer of the wireless transmitting device.

At operation 1804, the wireless transmitting device determines whether a PSDU length indication of the data field 708 for the PPDU 700 is greater than zero (i.e., the PSDU_LENGTH that is indicated in the TXVECTOR has a value greater than 0). At operation 1806, the wireless transmitting device selects a first value in response to determining that (1) aggregation is not to be applied to the PPDU 700 and (2) the PSDU length indication for the PPDU 700 is greater than zero. On this basis, at operation 1808, the wireless transmitting device calculates the number of symbols ($N_{SYM}$) in the data field 708 of the PPDU 700 based on the first value. In one embodiment, the first value is the PSDU length indication. When binary convolution coding (BCC) is used for the PPDU 700, the wireless transmitting device calculates the number of symbols in the data field 708 of the PPDU 700 according to Equation 3 where PSDU_LENGTH is the first value, $m_{STBC}$ is equal to 2 when space-time block coding (STBC) is used for the PPDU 700 and is otherwise set to 1, $N_{ES}$ indicates the number of BCC encoders used for the PPDU 700, $N_{DBPS}$ indicates the number of data bits in Orthogonal Frequency Division Multiplexing (OFDM) symbols in the PPDU, $N_{service}$ indicates the number of service bits, and $N_{tail}$ indicates the number of tail bits used for encoding data of the data field 708. When low-density parity-check (LDPC) coding is used for the PPDU 700, the wireless transmitting device calculates the number of symbols in the data field 708 of the PPDU 700 according to Equation 11 below where PSDU_LENGTH is the first value, $m_{STBC}$ is equal to 2 when space-time block coding (STBC) is used for the PPDU 700 and is otherwise set to 1, $N_{DBPS}$ indicates the number of data bits in Orthogonal Frequency Division Multiplexing (OFDM) symbols in the PPDU 700, and $N_{service}$ indicates the number of service bits.

$$N_{SYM} = m_{STBC} \times \left\lceil \dfrac{8 \cdot \text{PSDU\_LENGTH} + N_{service}}{m_{STBC} \cdot N_{DBPS}} \right\rceil \quad \text{Equation 11}$$

In contrast to operation 1806, at operation 1810, the wireless transmitting device selects a second value in response to determining that aggregation is to be applied to the PPDU 700. On this basis, at operation 1812, the wireless transmitting device calculates the number of symbols ($N_{SYM}$) in the data field 708 of the PPDU 700 based on the second value. In one embodiment, the second value is the length of an aggregated media access control (MAC) protocol data unit (A-MPDU) for the PPDU 700 (e.g., the APEP_LENGTH indicated in the TXVECTOR and the TXVECTOR is passed from a MAC layer of the transmitting device to a PHY layer of the wireless transmitting device). For example, the second value is the length of the A-MPDU for the PPDU 700 pre-end of frame padding. When binary convolution coding (BCC) is used for the PPDU 700, the wireless transmitting device calculates the number of symbols in the data field 708 of the PPDU according to Equation 1, where APEP_LENGTH is the second value, $m_{STBC}$ is equal to 2 when space-time block coding (STBC) is used for the PPDU 700 and is otherwise set to 1, $N_{ES}$ indicates the number of BCC encoders used for the PPDU 700, $N_{DBPS}$ indicates the number of data bits in Orthogonal Frequency Division Multiplexing (OFDM) symbols in the PPDU 700, $N_{service}$ indicates the number of service bits, and Mad indicates the number of tail bits used for encoding data of the data field 708. When low-density parity-check (LDPC) coding is used for the PPDU 700, the wireless transmitting device calculates the number of symbols in the data field 708 of the PPDU 700 according to Equation 2, where APEP_LENGTH is the second value, $m_{STBC}$ is equal to 2 when space-time block coding (STBC) is used for the PPDU 700 and is otherwise set to 1, $N_{DBPS}$ indicates the number of data bits in Orthogonal Frequency Division Multiplexing (OFDM) symbols in the PPDU 700, and $N_{service}$ indicates the number of service bits.

Following operation 1808 or operation 1812, the method 1800 moves to operation 1814. At operation 1814, the wireless transmitting device generates the PPDU 700, including a preamble portion and a PSDU. The preamble portion includes an indication that aggregation was applied to the PPDU 700.

Figure 19:
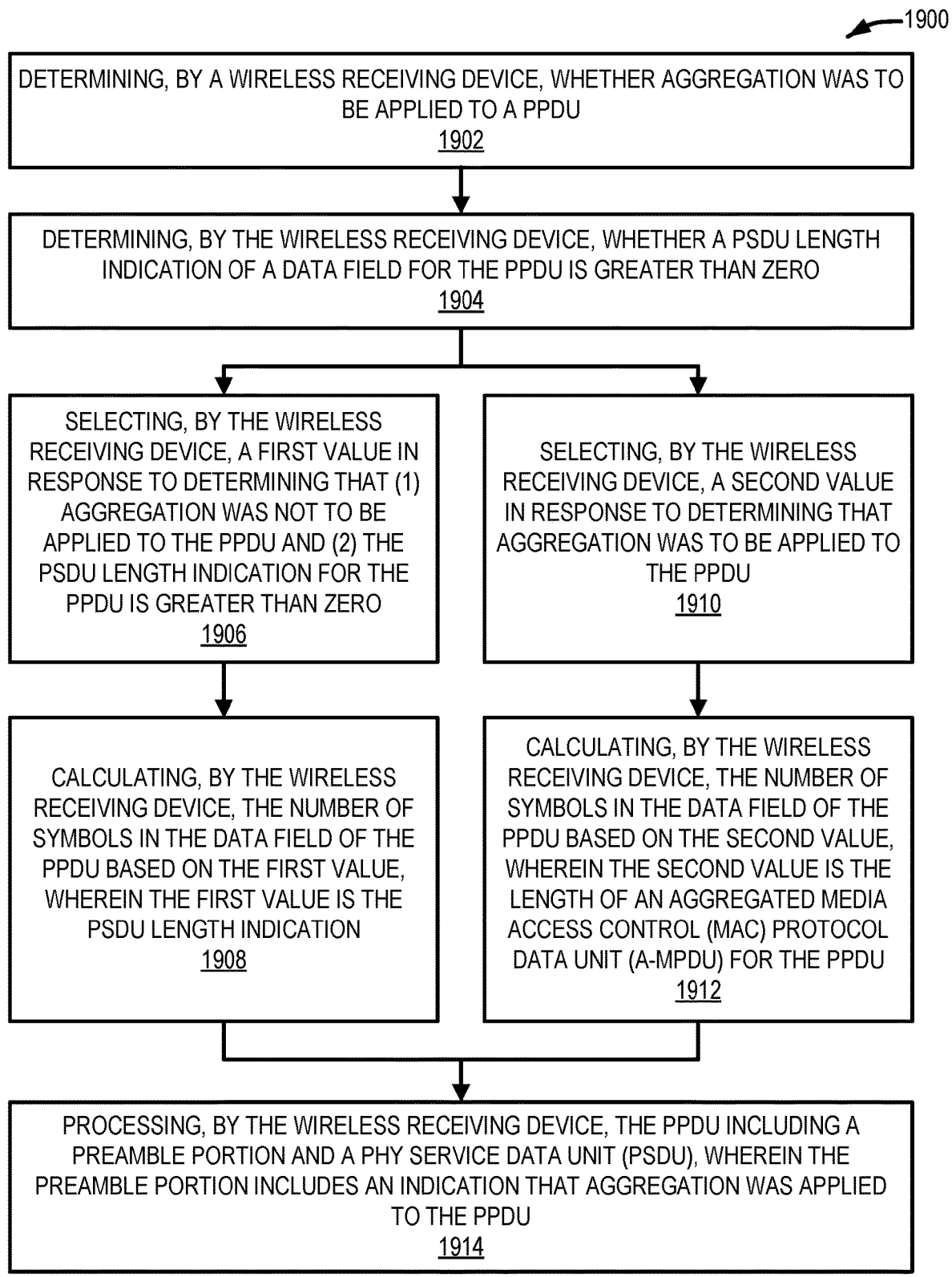
FIG. 19 shows a method for determining a number of symbols in a data field of a PPDU, in accordance with an example embodiment.

Turning now to FIG. 19, a method 1900 will be described for determining a number of symbols ($N_{SYM}$) in a data field 708 of a physical layer (PHY) protocol data unit (PPDU) 700, in accordance with an example embodiment. The method 1900 may be performed by one or more devices described herein. For example, the method 1900 may be performed by a WLAN device 104. Additionally, although shown in a particular order, in some embodiments the operations of the method 1900 may be performed in a different order. For example, although the operations of the method 1900 are shown in a sequential order, some of the operations may be performed in partially or entirely overlapping time periods.

As shown in FIG. 19, the method 1900 may commence at operation 1902 with a wireless receiving device (e.g., a WLAN device 104) determining whether aggregation was applied to the PPDU 700. For example, the wireless receiving device may determine that aggregation was applied to the PPDU 700 based on an AGGREGATION parameter in a RXVECTOR, and the RXVECTOR is passed from a PHY layer of the wireless receiving device to a MAC layer of the wireless receiving device.

At operation 1904, the wireless receiving device determines whether a PSDU length indication of the data field 708 for the PPDU 700 is greater than zero (i.e., the PSDU_LENGTH that is indicated in the RXVECTOR has a value greater than 0). At operation 1906, the wireless receiving device selects a first value in response to determining that (1) aggregation was not be applied to the PPDU 700 and (2) the PSDU length indication for the PPDU 700 is greater than zero. On this basis, at operation 1908, the wireless receiving device calculates the number of symbols ($N_{SYM}$) in the data field 708 of the PPDU 700 based on the first value. In one embodiment, the first value is the PSDU length indication. When binary convolution coding (BCC) is used for the PPDU 700, the wireless receiving device calculates the number of symbols in the data field 708 of the PPDU 700 according to Equation 3 where PSDU_LENGTH is the first value, $m_{STBC}$ is equal to 2 when space-time block coding (STBC) is used for the PPDU 700 and is otherwise set to 1, $N_{ES}$ indicates the number of BCC encoders used for the PPDU 700, $N_{DBPS}$ indicates the number of data bits in Orthogonal Frequency Division Multiplexing (OFDM) symbols in the PPDU, $N_{service}$ indicates the number of service bits, and $N_{tail}$ indicates the number of tail bits used for encoding data of the data field 708. When low-density parity-check (LDPC) coding is used for the PPDU 700, the wireless receiving device calculates the number of symbols in the data field 708 of the PPDU 700 according to Equation 11 where PSDU_LENGTH is the first value, $m_{STBC}$ is equal to 2 when space-time block coding (STBC) is used for the PPDU 700 and is otherwise set to 1, $N_{DBPS}$ indicates the number of data bits in Orthogonal Frequency Division Multiplexing (OFDM) symbols in the PPDU 700, and $N_{service}$ indicates the number of service bits.

In contrast to operation 1906, at operation 1910, the wireless receiving device selects a second value in response to determining that aggregation was applied to the PPDU 700. On this basis, at operation 1912, the wireless receiving device calculates the number of symbols ($N_{SYM}$) in the data field 708 of the PPDU 700 based on the second value. In one embodiment, the second value is the length of an aggregated media access control (MAC) protocol data unit (A-MPDU) for the PPDU 700 (e.g., the APEP_LENGTH indicated in the RXVECTOR and the RXVECTOR is passed from a PHY layer of the receiving device to a MAC layer of the wireless receiving device). For example, the second value is the length of the A-MPDU for the PPDU 700 pre-end of frame padding. When binary convolution coding (BCC) is used for the PPDU 700, the wireless receiving device calculates the number of symbols in the data field 708 of the PPDU according to Equation 1, where APEP_LENGTH is the second value, $m_{STBC}$ is equal to 2 when space-time block coding (STBC) is used for the PPDU 700 and is otherwise set to 1, $N_{ES}$ indicates the number of BCC encoders used for the PPDU 700, $N_{DBPS}$ indicates the number of data bits in Orthogonal Frequency Division Multiplexing (OFDM) symbols in the PPDU 700, $N_{service}$ indicates the number of service bits, and $N_{tail}$ indicates the number of tail bits used for encoding data of the data field 708. When low-density parity-check (LDPC) coding is used for the PPDU 700, the wireless receiving device calculates the number of symbols in the data field 708 of the PPDU 700 according to Equation 2, where APEP_LENGTH is the second value, $m_{STBC}$ is equal to 2 when space-time block coding (STBC) is used for the PPDU 700 and is otherwise set to 1, $N_{DBPS}$ indicates the number of data bits in Orthogonal Frequency Division Multiplexing (OFDM) symbols in the PPDU 700, and $N_{service}$ indicates the number of service bits.

Following operation 1908 or operation 1912, the method 1900 moves to operation 1914. At operation 1914, the wireless receiving device processes the PPDU 700, including a preamble portion and a PSDU. The preamble portion includes an indication that aggregation was applied to the PPDU 700.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for determining a number of symbols in a data field of a physical layer (PHY) protocol data unit (PPDU), the method comprising:
   determining, by a wireless transmitting device, whether an aggregation subfield of a signal field of the PPDU is to be set to 1; and
   responsive to determining that the aggregation subfield of the signal field of the PPDU is not to be set to 1, calculating, by the wireless transmitting device, the number of symbols in the data field of the PPDU based on a PHY service data unit (PSDU) length value,
   wherein when low-density parity-check (LDPC) coding is used for the PPDU, the wireless transmitting device calculates the number of symbols in the data field of the PPDU as:

$$m_{STBC} \times \left\lceil \frac{8 \cdot \text{PSDU\_LENGTH} + N_{service}}{m_{STBC} \cdot N_{DBPS}} \right\rceil,$$

wherein the PSDU_LENGTH is the PSDU length value, $m_{STBC}$ is equal to 2 when space-time block coding (STBC) is used for the PPDU and is otherwise equal to 1, $N_{DBPS}$ indicates the number of data bits in Orthogonal Frequency Division Multiplexing (OFDM) symbols in the PPDU, and $N_{service}$ indicates the number of service bits, and
   wherein the PSDU length value is provided in a transmission vector (TXVECTOR) and the TXVECTOR also includes an aggregated media access control (MAC) protocol data unit pre-end-of-frame padding (APEP) length value of the PPDU.

2. The method of claim 1, wherein the PPDU is a sub-1-Gigahertz (S1G) single user (SU) PPDU.

3. The method of claim 2, wherein the signal field of the PPDU is a SIG field or a SIG-A field of the PPDU.

4. The method of claim 1, wherein the PSDU length value is provided in the TXVECTOR by a PSDU_LENGTH parameter and the APEP length value is provided in the TXVECTOR by an APEP_LENGTH parameter.

5. The method of claim 1, further comprising:
   transmitting, by the wireless transmitting device, the PPDU, wherein the PPDU includes a preamble portion and a PSDU, wherein the aggregation subfield is included in the preamble portion of the PPDU.

6. The method of claim 5, wherein the aggregation subfield includes a single bit and the single bit being set to 1 indicates that aggregation is applied and the single bit being set to 0 indicates that aggregation is not applied.

7. The method of claim 1, wherein when binary convolution coding (BCC) is used for the PPDU, the wireless transmitting device calculates the number of symbols in the data field of the PPDU as:

$$m_{STBC} \times \left\lceil \frac{8 \cdot \text{PSDU\_LENGTH} + N_{service} + N_{tail} \cdot N_{ES}}{m_{STBC} \cdot N_{DBPS}} \right\rceil,$$

wherein $N_{ES}$ indicates the number of BCC encoders used for the PPDU and $N_{tail}$ indicates the number of tail bits used for encoding data of the data field.

8. A wireless transmitting device comprising:
   a radio frequency transmitter; and
   a processor to cause the wireless transmitting device to perform operations for determining a number of symbols in a data field of a physical layer (PHY) protocol data unit (PPDU), the operations comprising:
   determining whether an aggregation subfield of a signal field of the PPDU is to be set to 1; and
   responsive to determining that the aggregation subfield of the signal field of the PPDU is not to be set to 1, calculating the number of symbols in the data field of the PPDU based on a PHY service data unit (PSDU) length value,
   wherein when low-density parity-check (LDPC) coding is used for the PPDU, the wireless transmitting device calculates the number of symbols in the data field of the PPDU as:

$$m_{STBC} \times \left\lceil \frac{8 \cdot \text{PSDU\_LENGTH} + N_{service}}{m_{STBC} \cdot N_{DBPS}} \right\rceil,$$

wherein the PSDU_LENGTH is the PSDU length value, $m_{STBC}$ is equal to 2 when space-time block coding (STBC) is used for the PPDU and is otherwise equal to 1, $N_{DBPS}$ indicates the number of data bits in Orthogonal Frequency Division Multiplexing (OFDM) symbols in the PPDU, and $N_{service}$ indicates the number of service bits, and
   wherein the PSDU length value is provided in a transmission vector (TXVECTOR) and the TXVECTOR also includes an aggregated media access control (MAC) protocol data unit pre-end-of-frame padding (APEP) length value of the PPDU.

9. The wireless transmitting device of claim 8, wherein the PPDU is a sub-1-Gigahertz (S1G) single user (SU) PPDU.

10. The wireless transmitting device of claim 8, wherein the signal field of the PPDU is a SIG field or a SIG-A field of the PPDU.

11. The wireless transmitting device of claim 8, wherein the PSDU length value is provided in the TXVECTOR by a PSDU_LENGTH parameter and the APEP length value is provided in the TXVECTOR by an APEP_LENGTH parameter.

12. The wireless transmitting device of claim 8, wherein the operations further include:
transmitting the PPDU, wherein the PPDU includes a preamble portion and a PSDU, wherein the aggregation subfield is included in the preamble portion of the PPDU.

13. The wireless transmitting device of claim 8, wherein the aggregation subfield includes a single bit and the single bit being set to 1 indicates that aggregation is applied and the single bit being set to 0 indicates that aggregation is not applied.

14. The wireless transmitting device of claim 8, wherein when binary convolution coding (BCC) is used for the PPDU, the wireless transmitting device calculates the number of symbols in the data field of the PPDU as:

$$m_{STBC} \times \left\lceil \frac{8 \cdot \text{PSDU\_LENGTH} + N_{service} + N_{tail} \cdot N_{ES}}{m_{STBC} \cdot N_{DBPS}} \right\rceil,$$

wherein $N_{ES}$ indicates the number of BCC encoders used for the PPDU and $N_{tail}$ indicates the number of tail bits used for encoding data of the data field.

15. A non-transitory machine-readable medium having instructions stored therein, which when executed by a set of one or more processors of a wireless transmitting device, causes the wireless transmitting device to perform operations for determining a number of symbols in a data field of a physical layer (PHY) protocol data unit (PPDU), the operations comprising:
determining whether an aggregation subfield of a signal field of the PPDU is to be set to 1; and
responsive to determining that the aggregation subfield of the signal field of the PPDU is not to be set to 1, calculating the number of symbols in the data field of the PPDU based on a PHY service data unit (PSDU) length value,
wherein when low-density parity-check (LDPC) coding is used for the PPDU, the wireless transmitting device calculates the number of symbols in the data field of the PPDU as:

$$m_{STBC} \times \left\lceil \frac{8 \cdot \text{PSDU\_LENGTH} + N_{service}}{m_{STBC} \cdot N_{DBPS}} \right\rceil,$$

wherein the PSDU_LENGTH is the PSDU length value, $m_{STBC}$ is equal to 2 when space-time block coding (STBC) is used for the PPDU and is otherwise equal to 1, $N_{DBPS}$ indicates the number of data bits in Orthogonal Frequency Division Multiplexing (OFDM) symbols in the PPDU, and $N_{service}$ indicates the number of service bits, and
wherein the PSDU length value is provided in a transmission vector (TXVECTOR) and the TXVECTOR also includes an aggregated media access control (MAC) protocol data unit pre-end-of-frame padding (APEP) length value of the PPDU.

16. The non-transitory machine-readable medium of claim 15, wherein the PPDU is a sub-1-Gigahertz (S1G) single user (SU) PPDU.

17. The non-transitory machine-readable medium of claim 15, wherein the signal field of the PPDU is a SIG field or a SIG-A field of the PPDU.

18. The non-transitory machine-readable medium of claim 15, wherein the PSDU length value is provided in the TXVECTOR by a PSDU_LENGTH parameter and the APEP length value is provided in the TXVECTOR by an APEP_LENGTH parameter.

19. The non-transitory machine-readable medium of claim 15, wherein the operations further comprise:
transmitting the PPDU, wherein the PPDU includes a preamble portion and a PSDU, wherein the aggregation subfield is included in the preamble portion of the PPDU.

20. The non-transitory machine-readable medium of claim 15, wherein when binary convolution coding (BCC) is used for the PPDU, the wireless transmitting device calculates the number of symbols in the data field of the PPDU as:

$$m_{STBC} \times \left\lceil \frac{8 \cdot \text{PSDU\_LENGTH} + N_{service} + N_{tail} \cdot N_{ES}}{m_{STBC} \cdot N_{DBPS}} \right\rceil,$$

wherein $N_{ES}$ indicates the number of BCC encoders used for the PPDU and $N_{tail}$ indicates the number of tail bits used for encoding data of the data field.

* * * * *